United States Patent [19]

Vinchattle

[11] Patent Number: 4,666,177
[45] Date of Patent: May 19, 1987

[54] HITCH

[76] Inventor: Beryl Vinchattle, 3011 20th Ave. N., Fort Dodge, Iowa 50501

[21] Appl. No.: 863,042

[22] Filed: May 14, 1986

[51] Int. Cl.[4] .............................................. B60D 1/06
[52] U.S. Cl. .................................. 280/478 B; 280/477
[58] Field of Search ............................. 280/477, 478 B

[56] References Cited

U.S. PATENT DOCUMENTS

| | | | |
|---|---|---|---|
| 1,384,944 | 7/1921 | Flood | 280/477 |
| 2,197,157 | 4/1940 | Reynolds | 280/477 |
| 2,478,736 | 8/1949 | Balzer | 280/477 |
| 2,556,748 | 6/1951 | Buckley | 280/477 |
| 2,671,673 | 3/1954 | Benson | 280/477 |
| 3,420,549 | 1/1969 | Robinson | 280/477 |
| 3,879,062 | 4/1975 | Miller | 280/477 |
| 4,039,203 | 8/1977 | Kunze | 280/515 |

Primary Examiner—John J. Love
Assistant Examiner—Donn McGiehan
Attorney, Agent, or Firm—Morton S. Adler

[57] ABSTRACT

A hitch for coupling a drawbar on a draft vehicle to a tongue bar on a trailer or pulled vehicle includes a preferably square tubular housing having a forward end for removable attachment to the drawbar and a rearward end for receiving and removably securing the tongue bar. Projecting from the rearward end is a four sided funnel or hopper shaped tongue bar guide comprising respective top and bottom immovable plates rigidly secured to the top and bottom edges of the housing and movable opposed side plates each hingedly secured to opposed sides of the housing so as to be separately movable away from and into abutment with the top and bottom plates. Spring means yieldingly hold the side plates in abutment with the top and bottom plates and a releasable locking assembly within the housing holds the side plates immovable while the tongue bar is being introduced and guided into the housing. A spring loaded hitch pin on the housing automatically engages the tongue bar at a predetermined point of movement with the tongue bar engaging the locking assembly to release it so that each side plate can yield and swing outwardly from contact by the tongue bar in a turning movement during travel. The side plates are automatically returned to locked position when the tongue bar is unhitched and removed from the housing.

11 Claims, 8 Drawing Figures

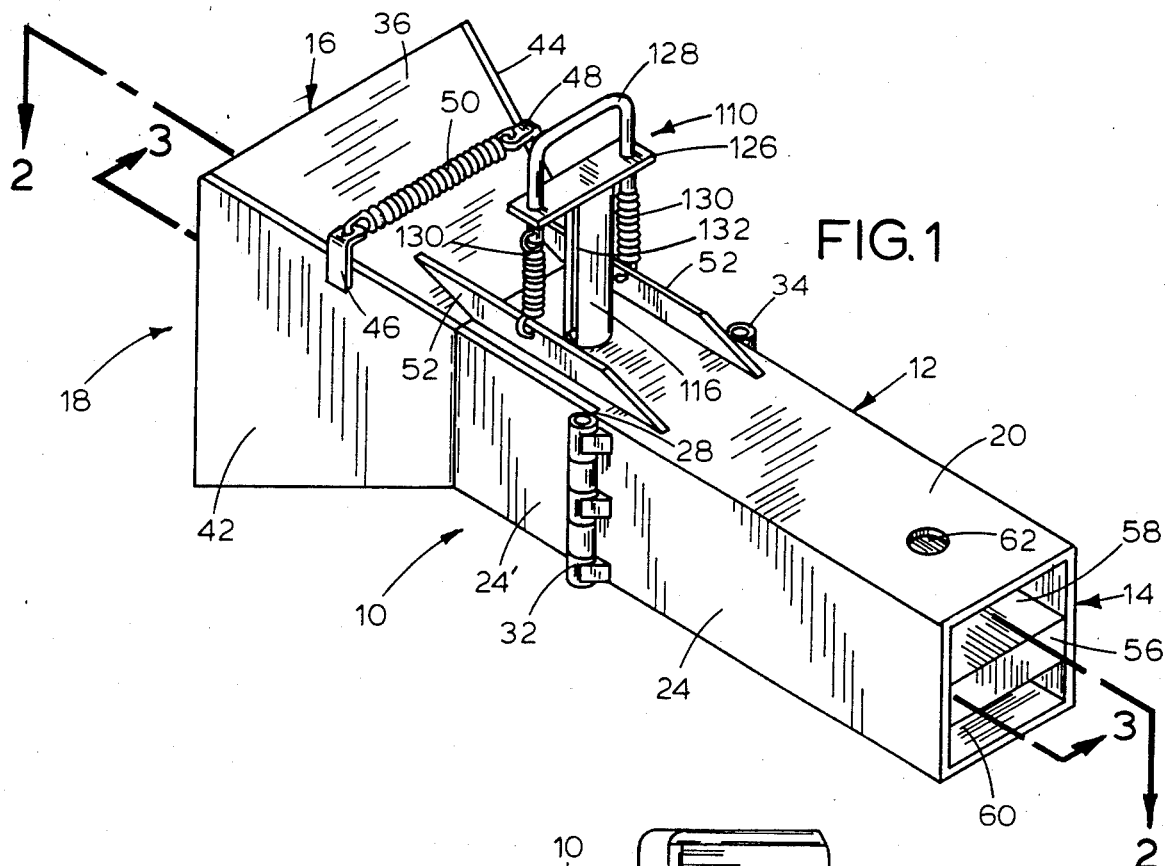
FIG.1
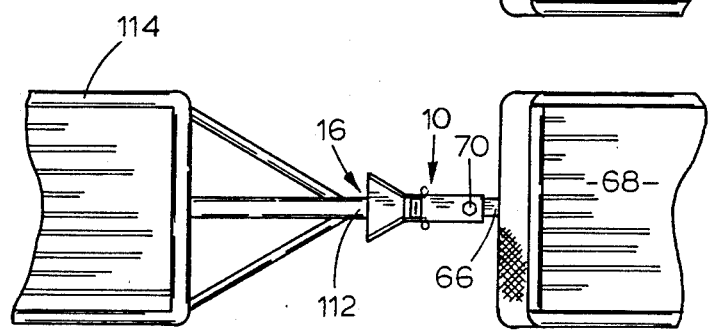
FIG.6
FIG.7
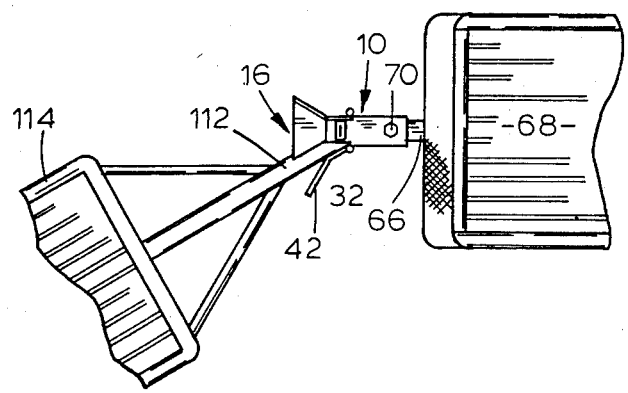
FIG.8

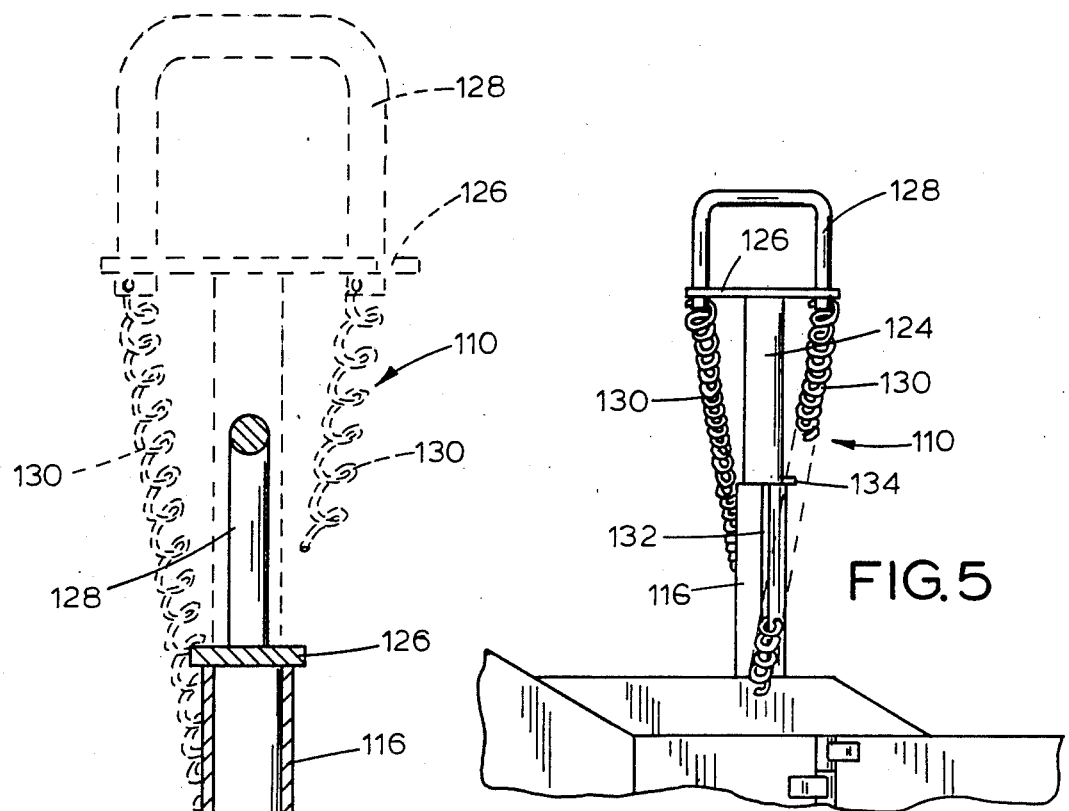
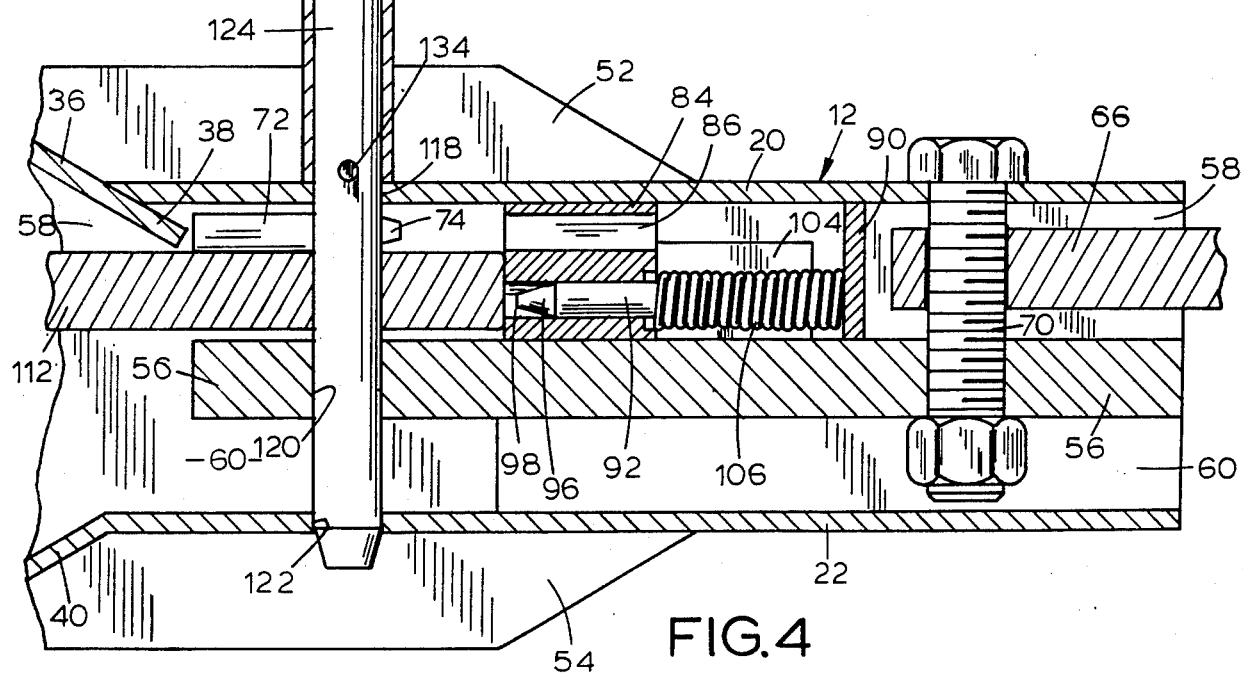
FIG. 5
FIG. 4

HITCH

BACKGROUND OF THE INVENTION

This invention relates to improvements in trailer hitches. One of the inherent problems in hitching a draft vehicle to the tongue of a trailer is that the driver of the vehicle cannot see the tongue so that proper registration of the tongue and hitch component is often a matter of trial and error. Many types of apparatus are present in the prior art directed to this problem and it is an object of the present invention to provide a hitch with aligning capabilities that are an improvement over and more efficient than such type of hitches presently available.

More particularly, it is an object herein to provide a hitch designed for coupling to the drawbar on a draft vehicle that includes a guide means for guiding the trailer tongue into automatic locking position with a spring loaded hitch pin.

Another object is to provide a hitch as characterized on which the guide is in the form of a four sided flared housing with two opposed movable sides that are held immovable by a lock means while the tongue is guided into registration with the hitch pin and wherein the tongue, when hitched, effects the release of the lock means so the movable guide sides can yield in a turning movement and not restrict the lateral movement of the tongue in such manuever.

A further object is to provide a hitch of the above class on which the movable sides of the guide are automatically locked when the tongue is unhitched.

SUMMARY

In accordance with the present invention, this hitch includes a preferably square tubular housing having a forward end for removable attachment to the drawbar of a draft vehicle and a rearward end for receiving and removably securing the tongue bar on a trailer or pulled vehicle. Projecting from the rearward end is a four sided funnel or hopper shaped tongue bar guide comprising respective top and bottom immovable plates rigidly secured to the top and bottom edges of the housing and movable opposed side plates each hingedly secured to opposed sides of the housing so as to be separately movable away from and into abutment with the top and bottom plates. Spring means yieldingly hold the side plates in abutment with the top and bottom plates and releasable locking assembly within the housing holds the side plates immovable while the tongue bar is being introduced and guided into the housing. A spring loaded hitch pin in the housing automatically engages the tongue bar at a predetermined point of movement with the tongue bar engaging the locking assembly to release it so that each side plate can yield and swing outwardly from contact by the tongue bar in a turning movement during travel. The side plates are automatically returned to locked position when the tongue bar is unhitched.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 1 is a perspective view of a hitch according to this invention,

FIG. 4 is a cross sectional view of the area disclosed in FIG. 3 to show the locked position of the hitch pin relative to the tongue bar, the unlocked position of the side guide plates and the unlocked position of the hitch pin handle shown in broken lines, FIG. 5 is an elevational view of the manually operated hitch pin shown in an elevated inoperable position, FIG. 6 is a fragmentary schematic view showing this hitch attached to the drawbar of a draft vehicle, FIG. 7 is a schematic view similar to FIG. 6 showing the tongue bar of a trailer or pulled vehicle attached to the hitch in longitudinal alignment, and FIG. 8 is a schematic view similar to FIG. 7 showing the movement of a side guide plate in a turning position of the vehicles.

DESCRIPTION OF THE PREFERRED EMBODIMENTS

Figure 2:
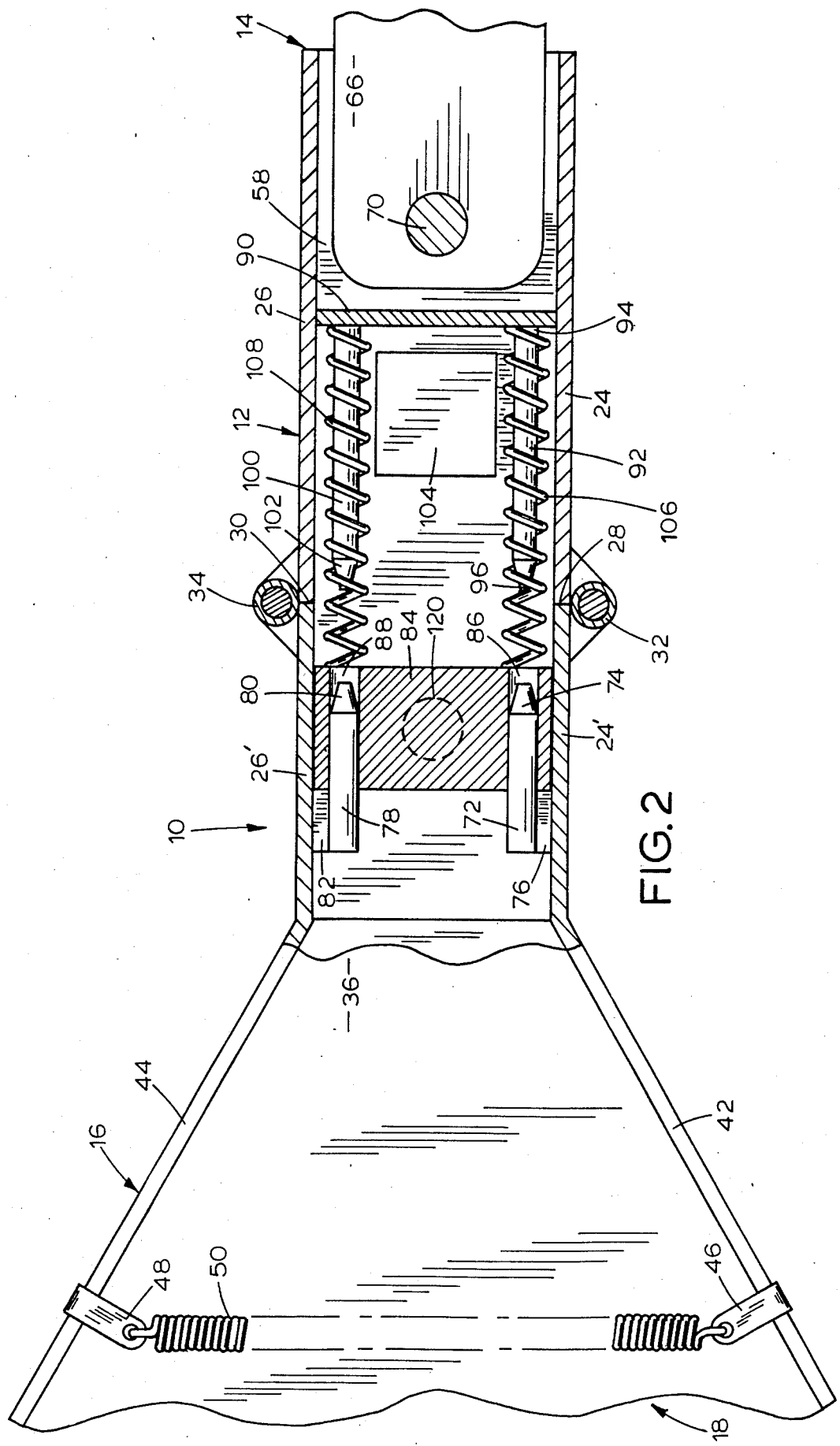
FIG. 2 is a cross sectional view taken on the line 2—2 of FIG. 1 showing the locked position of the opposed side guide plates at the tongue bar receiving end.

Referring to the drawings, this new hitch is designated by the numeral 10 as best seen in FIG. 1 and comprises generally a forwardly oriented housing 12, preferably of square tubing, defining a forward end 14 and a four sided funnel or hopper shaped tongue bar guide 16 at the opposite end from end 14 to define the rear end 18.

Figure 3:
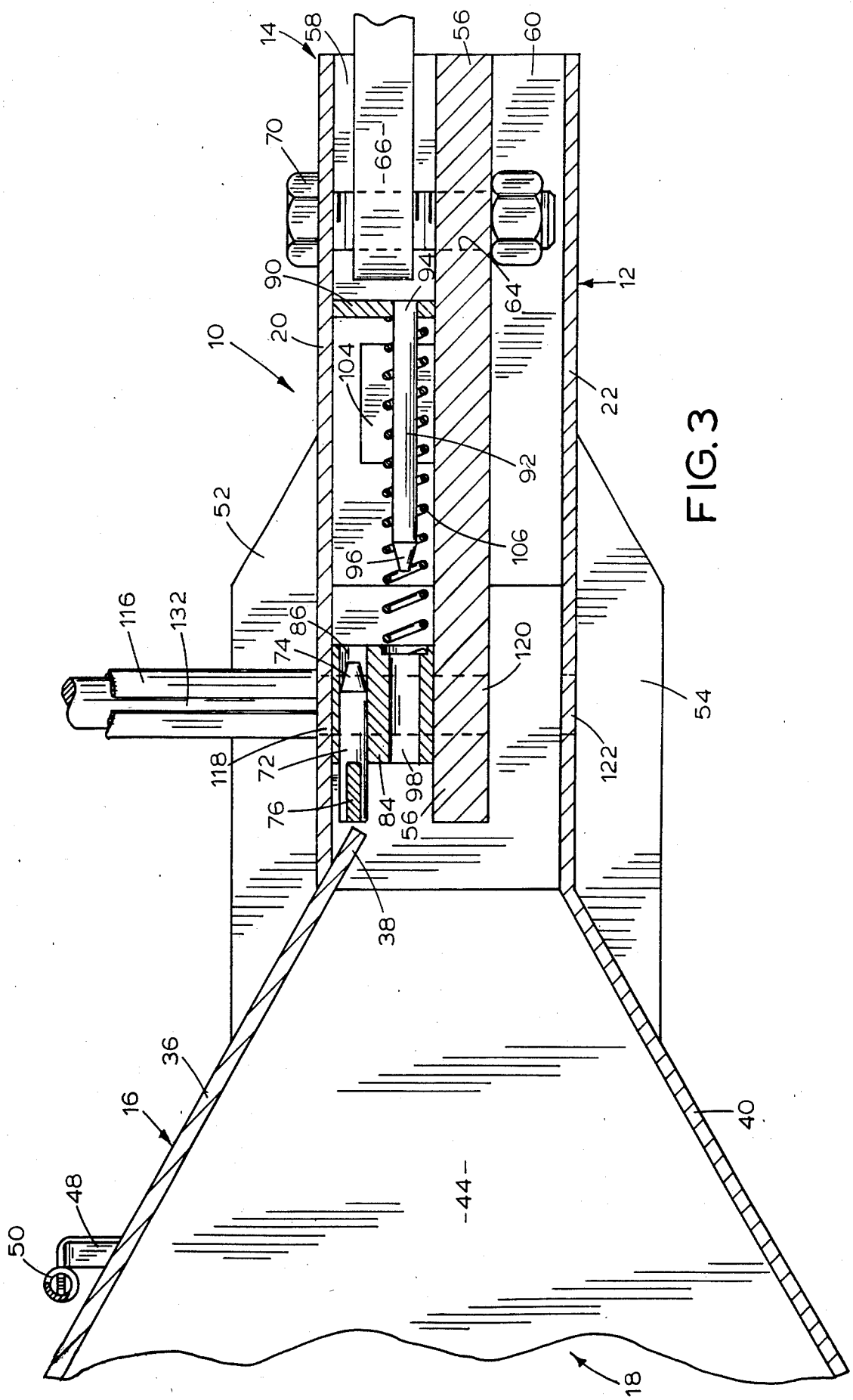
FIG. 3 is a cross sectional view taken on the line 3—3 of FIG. 1.

Housing 12 includes a top 20, a bottom 22, fixed integral sides 24, 26 extending from end 14 to points 28, 30 (FIG. 2) and movable sides 24', 26' hingedly connected respectively to sides 24, 26 by hinge means 32, 34. Guide 16 includes a flared top plate 36 fixedly secured to housing top 20 and extending below top 20 into housing 12 as at 38 for purposes to be later explained, a flared bottom plate 40 fixedly secured to housing bottom 22, all as seen in FIG. 3 and opposed flared sides 42, 44 wherein side 42 is integral with movable housing side 24' and side 44 is similarly arranged relative to housing side 26' as best seen in FIG. 2. Respective brackets 46, 48 on guide side 42, 44 (FIGS. 1, 2) are connected by a spring 50 across plate 36 to normally yieldingly hold sides 42, 44 closed in abutment with top plate 36 and bottom plate 40. Spaced gussets 52 are provided for housing top 20 and guide plate 36 and similar gussets 54 are provided for housing bottom 22 and guide plate 40.

Within housing 12, a longitudinal plate 56 intermediate top 20 and bottom 22 is secured to housing sides 24, 26 between end 14 and points 28, 30 and extends rearwardly from 28, 30 adjacent sides 24', 26' to define an upper compartment 58 and a lower compartment 60 as seen in FIGS. 1, 3, 4. Housing top 20 near end 14 (FIG. 1) is provided with a hole 62 and plate 56 has a registering hole 64 whereby the apertured drawbar 66 on a draft vehicle 68 can be received in compartment 58 at end 14 and secured in a well known manner by a removable pin or bolt 70 as seen in FIGS. 3, 4.

Thus far described it will be understood that while guide sides 42, 44 are yieldingly held in closed position by spring 50 in abutment with guide top and bottom plates, 36, 40, they can be opened or moved outwardly under appropriate pressure due to their respective hinged attachment to housing sides 24', 26'. However, for purposes that will appear, it is desirable that sides 42, 44 be rendered immovable at times and to describe how this is accomplished, reference is made more particularly to FIGS. 2, 3.

Within housing 12, an elongated lock pin 72 having a tapered end 74 oriented toward housing end 14 has it other end rigidly secured to block 76 that in turn is rigidly secured to side 24' near top 20 so that the major length of pin 72 is disposed in closely spaced parallel relationship to side 24' and top 20. This same arrangement is repeated for side 26' in the form of pin 78, tapered end 80 and block 82. A block member 84 disposed on plate 56 and slidable relative thereto has two through holes 86, 88 in its upper portion spaced to register respectively with pins 72, 78 whereby with block 84 positioned as seen in FIG. 2, pins 72, 78 are journalled respectively in holes 86, 88 to effectively lock guide sides 42, 44 against movement away from their closed position. Block 84 is normally held in the locked position with pins 72, 78 but is movable to an unlocked position which will now be described with reference more particularly to FIGS. 2, 3, 4.

In compartment 58 of housing 12 and slightly inwardly of the area therein for pin 70, there is a fixed vertical wall 90 between housing top 20 and plate 56. An elongated spring guide pin 92 disposed in closely spaced parallel relationship to plate 56 and side 24 has one end 94 anchored to the lower portion of wall 90 with the opposite tapered end 96 oriented toward slide block 84 and in registration with a through hole 98 in the lower portion of said block, said hole 98 being in spaced parallel relationship to hole 86 as seen in FIGS. 3, 4. A pin 100, similar to pin 92, is similarly arranged adjacent wall 26 (FIG. 2) so that its tapered end 102 registers with a through hole in block 84 (not shown) but similar to hole 98 and below hole 88. A stop block 104 is secured to plate 56 intermediate pins 92, 100. Coil springs, 106 on pin 92 and 108 on pin 100, each engage wall 90 at one end and normally are expanded so their other ends are in engagement with block 84 to hold it in locking position with pins 72, 78 as seen in FIG. 2. By this arrangement, as will later be referred to in more detail, block 84 is movable by an appropriate force to be clear of lock pins 72, 78 to a stop position against block 104 at which point pins 92, 100 are journalled in the lower registering holes in block 84 and springs 106, 108 are compressed whereby sides 42, 44 are capable of being opened or moved. Release of the force on block 84 causes springs 106, 108 to move block 84 to its locked position with pins 72, 78.

A hitch pin assembly 110 for securing an apertured tongue bar 112 on a trailer or pulled vehicle 114 is provided as follows. A vertically disposed hitch pin guide tube or pipe 116 is mounted to housing top 20 intermediate sides 24', 26' and gussets 52 and registers with a hole 118 in top 20, hole 120 in plate 56 and hole 122 in housing bottom 22 as best seen in FIG. 4. A hitch pin 124 is slidable in guide 116 so as to be journalled at times through holes 118, 120 and 122 and is secured at its top to a horizontal plate 126 to which there is attached the handle 128. Opposed ends of plate 126 are connected by like springs 130 to a respective gusset 52 for normally urging pin 124 downwardly to its locked position seen in FIG. 4. Guide 116 has a vertical slot 132 in which a boss 134 on pin 124 travels during movement of pin 124 and when pin 124 is manually pulled upwardly by handle 128 for disengagement of tongue bar 112, a slight rotation of pin 124 will position boss 134 out of registration with slot 132 against the top of guide 116, for which a notch may be provided if desired, to hold pin 124 in its inoperable position as seen in FIG. 5.

OPERATION

With hitch assembly 10 attached to the drawbar 66 on the draft vehicle 68 by pin 70, plate 84 is urged into locking engagement with pins 72, 78 (FIG. 2) by springs 106, 108 to hold guide sides 42, 44 against movement so that guide 16 presents the four rigid flared sides 36, 40, 42 and 44. At this time, hitch pin 124 is positioned with boss 134 in slot 132 so that springs 130 urge pin 124 downwardly where it will rest on plate 84 which is between hole 118 in top 20 and hole 120 in plate 56. The apertured tongue bar 112 on the trailing vehicle 114 is introduced to assembly 10 either by backing the draft vehicle 68 or moving the pulled vehicle 114 forwardly as is well known and the relatively wide mouth of guide 16 expedites and simplifies the registration of tongue bar 112 with assembly 10 whereby bar 112 is guided into proper position into compartment 58 and into abutment with block 84. In this movement, the extension 38 of guide top plate 36 prevents the bar 112 from hitting or damaging the lock pins 72, 78. As bar 112 engages block 84, such block is moved forwardly to its stop position against block 104 (FIG. 4) where it is then out of engagement with pins 72, 78 and with hitch pin 124 so that as the aperture in bar 112 comes into registration with pin 124, such pin under force from springs 130 will automatically drop through bar 112, hole 120 in plate 56 and hole in bottom 22 of housing 12 to effectively lock bar 112 in place. At this point, guide sides 42, 44 are no longer locked so that in any turning movement of the vehicles in travel, such sides can open or swing out in the appropriate direction against the force of bar 112 as seen in FIG. 8 and will automatically return to closed position by spring 50 after the turn has been completed. Bar 112 can be unhitched by elevating pin 124 as described and when bar 112 has been withdrawn from assembly 10, block 84 will automatically return to locked position relative to pins 72,78. Accordingly, in view of the foregoing, it is thought a full understanding of the construction and operation of this invention will be had and the advantages of the same will be appreciated.

I claim:

1. A hitch for coupling the drawbar on a draft vehicle to an apertured tongue bar on a trailer, comprising:
   an elongated hollow housing having a forward end and a rear end,
   means on said forward end for coupling engagement with the drawbar on a draft vehicle,
   a rearwardly oriented wide mouth hopper shaped tongue bar guide at the rear of said housing comprising separate rigidly secured and outwardly flared top and bottom plates and separate opposed outwardly flared side plates in contiguous relationship to said respective top and bottom plates to define a closed position,
   each side plate hingedly secured to said housing for movement to an open position,
   yielding means connecting said side plates to normally hold them in closed position,
   an elongated plate secured interiorly of said housing,
   said housing near its rear end and said elongated plate provided with registering holes,
   lock means operably connected to said side plates for holding them in closed position, a lock means engaging member slidably disposed on said elongated plate and normally positioned to intersect the plane through said registering holes and engage said lock means to hold said side plates immovable in closed position, a vertically disposed spring loaded downwardly biased hitch pin mounted on said housing in registration with said registering holes and normally resting on said lock means engaging member, and said guide serving to direct the tongue bar into communication with said housing against said lock means engaging member to move it out of engagement with said lock means and out of registration with said registering holes whereby the aperture in said tongue bar registers with said registering holes and said hitch pin automatically drops through said aperture to couple said tongue bar to said housing with said side plates being free to move to open position against pressure from the tongue bar in a turning movement of the vehicles.

2. A hitch as defined in claim 1 including means in said housing for returning said lock means engaging member to engagement with said lock means when said tongue bar is uncoupled and removed from said housing.

3. A hitch as defined in claim 1 including:
handle means on said hitch pin for manually elevating it out of engagement with said tongue bar, and
means on said hitch pin to hold it in inoperable position.

4. A hitch as defined in claim 2 including:
handle means on said hitch pin for manually elevating it out of engagement with said tongue bar, and
means on said hitch pin to hold it in operable position.

5. A hitch for coupling the drawbar on a draft vehicle to an apertured tongue bar on a trailer, comprising:
an elongated hollow square tubular housing having a forward end and a rear end defining a top, a bottom and opposed sides,
each side defining a fixed forward portion and a movable rear portion hingedly secured to its respective adjacent forward portion,
means on said forward end for coupling engagement with the drawbar on a draft vehicle,
a rearwardly oriented wide mouth hopper shaper tongue bar guide at the rear of said housing comprising separate outwardly flared top and bottom plates rigidly secured respectively to said top and bottom of said housing and separate opposed outwardly flared side plates in contiguous relationship to said respective top and bottom plates to define a closed position,
each side plate integral with a respective movable rear portion for movement to an open position,
yielding means connecting said side plates to normally hold them in closed position,
an elongated plate secured interiorly of said housing,
said housing near its rear end and said elongated plate provided with registering holes,
respective elongated lock pins secured to each movable rear portion within said housing,
a block member slidably disposed on said elongated plate and provided with spaced through holes to register respectively with said lock pins,
said block member normally positioned to intersect the plane through said registering holes with said lock pins journalled in said spaced holes to hold said side plates immovable in closed position, a vertically disposed spring loaded downwardly biased hitch pin mounted on said housing in registration with said registering holes and normally resting on said block member, and said guide serving to direct the tongue bar into communication with said housing against said block member to move it out of engagement with said lock pins and out of registration with said registering holes whereby the aperture in said tongue bar registers with said registering holes and said hitch pin automatically drops through said aperture to couple said tongue bar to said housing with said side plates being free to move to open position against pressure from the tongue bar in a turning movement of the vehicles.

6. A hitch as defined in claim 5 including means in said housing for returning said block member to locking engagement with said lock pins when said tongue bar is uncoupled and removed from said housing.

7. A hitch as defined in claim 5 including said top plate on said guide extending angularly into said housing adjacent said lock pins to protect them from contact and damage from said tongue bar when entering said housing.

8. A hitch as defined in claim 5 including:
handle means on said hitch pin for manually elevating it out of engagement with said tongue bar, and
means on said hitch pin to hold it in inoperable position.

9. A hitch for coupling the drawbar on a draft vehicle to an apertured tongue bar on a trailer, comprising:
an elongated hollow square tubular housing having a forward end and a rear end defining a top, a bottom and opposed sides,
each side defining a fixed forward portion and a movable rear portion hingedly secured to its respective adjacent forward portion,
means on said forward end for coupling engagement with the drawbar on a draft vehicle,
a rearwardly oriented wide mouth hopper shaped tongue bar guide at the rear of said housing comprising separate outwardly flared top and bottom plates rigidly secured respectively to said top and bottom of said housing and separate opposed outwardly flared side plates in contiguous relationship to said top and bottom plates to define a closed position,
each side integral with a respective movable rear portion for movement to an open position,
yielding means connecting said side plates to normally hold them in closed position,
an elongated plate secured interiorly of said housing,
said housing near its rear end and said elongated plate provided with registering holes,
respective elongated lock pins secured to each movable rear portion within said housing near the top thereof,
a block member having an upper and lower portion slidably disposed on said elongated plate and provided with a first pair of spaced through holes in said upper portion to register respectively with said lock pins,
said block member normally positioned to intersect the plane through said registering holes with said lock pins journalled in said first pair of spaced holes to hold said side plates immovable in closed position, a vertically disposed spring loaded downwardly biased hitch pin mounted on said housing in registration with said registering holes and normally resting on said block member, said guide serving to direct the tongue bar into communication with said housing against said block member to move it out of engagement with said lock pins and out of registration with said registering holes whereby the aperture in said tongue bar registers with said registering holes and said hitch pin automatically drops through said aperture to couple said tongue bar to said housing with said side plates being free to move to open position against pressure from the tongue bar in a turning movement of the vehicles, a vertical wall near the forward end of said housing intermediate said elongated plate and said top of said housing, a pair of elongated spaced parallel spring guide pins secured at one end to said wall to extend rearwardly towards the lower portion of said block member, respective coil springs on said guide pins engaging said wall and the lower portion of said block member to normally hold it in engagement with said lock pins, said block member having a second pair of spaced through holes through its lower portion in registration respectively with said guide pins, a stop block on said elongated plate intermediate said guide pins, in the movement of said block member by said tongue bar, said block member compreses said coil springs with said guide pins entering said second pair of holes and said block member comes to rest against said stop block, and upon removal of said tongue bar from said housing, said block member is returned by said coil springs into engagement with said lock pins.

10. A hitch as defined in claim 9 including said top plate on said guide extending angularly into said housing adjacent said lock pins to protect them from contact and damage from said tongue bar when entering said housing.

11. A hitch as defined in claim 9 including:

handle means on said hitch pin for manually elevating it out of engagement with said tongue bar, and means on said hitch pin to hold it in inoperable position.

* * * * *